(12) United States Patent
Allen et al.

(10) Patent No.: US 7,661,828 B2
(45) Date of Patent: Feb. 16, 2010

(54) ADJUSTING LIGHT INTENSITY

(75) Inventors: William J. Allen, Corvallis, OR (US); Ravi Prasad, Corvallis, OR (US); Gregory J. May, Corvallis, OR (US); John A. de Vos, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 11/149,570

(22) Filed: Jun. 10, 2005

(65) Prior Publication Data

US 2006/0279477 A1    Dec. 14, 2006

(51) Int. Cl.
G03B 21/14    (2006.01)
G03B 21/60    (2006.01)

(52) U.S. Cl. ............................ 353/79; 353/85; 359/459

(58) Field of Classification Search .................. 353/79, 353/121, 122; 359/443, 446, 459
See application file for complete search history.

(56) References Cited

U.S. PATENT DOCUMENTS

| | | | |
|---|---|---|---|
| 5,416,617 A | 5/1995 | Loiseaux et al. | |
| 5,784,138 A | 7/1998 | Kollarits et al. | |
| 6,481,851 B1 | 11/2002 | McNelley et al. | |
| 6,538,814 B2 | 3/2003 | Hunter et al. | |
| 6,572,232 B2 | 6/2003 | Yaniv | |
| 6,577,355 B1 | 6/2003 | Yaniv | |
| 6,726,335 B2 | 4/2004 | Yaniv et al. | |
| 6,817,717 B2 | 11/2004 | Childers et al. | |
| 6,853,486 B2 | 2/2005 | Cruz-Uribe et al. | |
| 7,106,505 B2 * | 9/2006 | Whitehead et al. | 359/443 |
| 7,403,332 B2 * | 7/2008 | Whitehead et al. | 359/443 |
| 7,457,035 B2 * | 11/2008 | Fricke et al. | 359/443 |
| 2003/0174295 A1 * | 9/2003 | Yaniv et al. | 353/87 |
| 2003/0184718 A1 | 10/2003 | Childers et al. | |
| 2003/0222980 A1 | 12/2003 | Miyagaki et al. | |
| 2004/0012849 A1 * | 1/2004 | Cruz-Uribe et al. | 359/449 |
| 2004/0085636 A1 | 5/2004 | Katoh | |
| 2004/0095558 A1 | 5/2004 | Whitehead et al. | |
| 2004/0196253 A1 | 10/2004 | Eichenlaub | |
| 2006/0061860 A1 * | 3/2006 | Devos et al. | 359/443 |
| 2006/0082873 A1 * | 4/2006 | Allen et al. | 359/443 |
| 2006/0250585 A1 * | 11/2006 | Anderson et al. | 353/79 |
| 2006/0279839 A1 * | 12/2006 | May et al. | 359/443 |
| 2007/0081130 A1 * | 4/2007 | May et al. | 353/85 |

* cited by examiner

Primary Examiner—William C Dowling

(57) ABSTRACT

In embodiments, an intensity of light is adjusted according to data indicating the states for elements.

31 Claims, 14 Drawing Sheets

ADJUSTING LIGHT INTENSITY

BACKGROUND

Projection systems are regarded as a cost effective way of providing very large array displays for a relatively low cost. Such systems, however, suffer from ambient light interference for all but the darkest rooms. For normal daytime ambient lighting, images may look "washed out" with ambient light.

DETAILED DESCRIPTION

Figure 1:
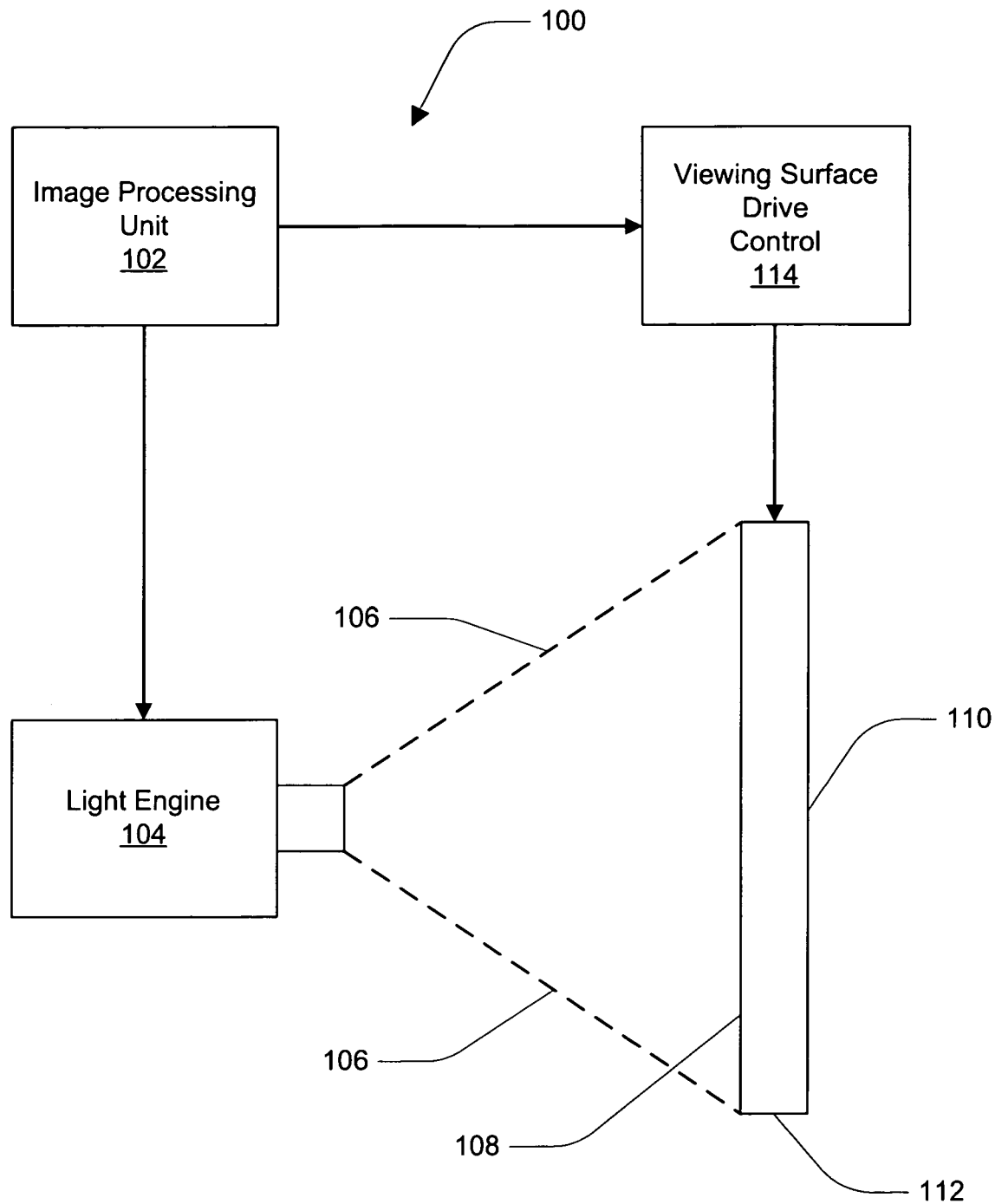
FIG. 1 is a schematic of an embodiment of a projection system in accordance with one embodiment of the disclosure.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense, and the scope of the present disclosure is defined by the appended claims and equivalents thereof.

An apparatus in accordance with one embodiment includes a light engine to project colored spots of light onto elements of a surface at a first resolution and a processing unit configured to cause the elements of the surface in one or more zones to change states in response to image data, and/or viewing conditions and/or user input. For embodiments of the present disclosure, the viewing surface is of a type capable of varying its reflectivity (in the case of front projection systems) or transmissivity (in the case of rear projection systems) in at least one element. For certain embodiments, the viewing surface is capable of varying the reflectivity or transmissivity of various components of the light spectrum independent of other components of the light spectrum. For example, a band in the red spectrum may be reflected or transmitted independently of a band in the blue spectrum. For other embodiments, reflectivity or transmissivity may be varied across the visible spectrum more or less equally across the spectrum. For embodiments of the present disclosure, the light modulation function is split between the light engine and the viewing surface. For one embodiment, upon receiving input image data, the processing unit sends a first set of signals to control the light engine and a second set of signals to control the viewing surface. This system can operate in open loop, e.g., data sent to the projector and data sent to the screen are independent, or closed loop, e.g., feedback information, such as alignment and timing information, is obtained and used to adjust the projector.

In response to receiving an incoming video signal, the processing unit determines a desired reflectivity or transmissivity for each zone of the viewing surface. The viewing surface may be comprised of one or more zones, and may contain sufficient zones to have a higher resolution than an associated projector. The viewing surface may contain zones of differing size, shape and dimensions. In addition, determination of desired reflectivity or transmissivity may be made by analysis of individual color components of the image data. The determination of desired reflectivity or transmissivity may further be determined taking into account temporal aspects of the projection of a single frame of image data and/or temporal aspects of projection of a sequence of image frames. For example, determination of desired reflectivity or transmissivity may be determined over a time period containing a number of scenes, on a scene-by-scene basis, on a frame-by-frame basis or on a color sub-field-by-color sub-field basis. Note that the desired reflectivity or transmissivity may be determined by the brightest pixel of the zone or filtering may be performed to discard outlying pixel values, e.g., noise or other artifacts may produce unintentionally bright or dim pixels, so some number, percentage or other subset of the image pixels could be ignored for purposes of calculating the desired reflectivity or transmissivity for a zone. As one example, a filtering process could be used to remove aberrant data by looking for image elements whose values lie more than a prescribed number of standard deviations from the average pixel value for a zone.

Regardless of whether front projection or rear projection is used, some form of light engine is utilized to generate rays of light to be reflected from a viewing surface associated with a display, or transmitted through a viewing surface, respectively. One type of light engine utilizes a light source, a color wheel and a spatial light modulator. Such light engines produce color in a manner typically referred to as "field sequential color." Light generated from the light source is directed onto the color wheel, which sequentially filters light from the light source. The color wheel typically generates a sequence of primary colors of light: red, green and blue, and optionally also generates white light in sequence. The red, green, white and blue colors of light are sequentially sent to the spatial light modulator, which spatially modulates the colored light depending on the image data by controlling the intensity of each color of light at individual positions in the projected image. The modulated color sub-fields are projected in a sequence at a rapid rate onto a viewing surface, and the human eye integrates the sequences of color sub-fields and a continuous image that is perceived to be flicker-free can be projected.

For such systems, projected intensity and color for a given pixel is determined by its modulation, i.e., an amount of light the spatial modulator allows to be delivered to the viewing surface at the location corresponding to the given pixel. Some light modulators, such as digital micro-mirror (DMD) devices manufactured by Texas Instruments modulate light intensity in the time domain. Tiny micro-mirrors, one for each image pixel, oscillate and alternatively direct light onto the screen at each pixel position or direct the light into a trap or absorber. The intensity of projected light corresponds to the duty cycle of the mirrors. In field sequential systems, mirrors independently modulate intensity of each color sub-field. As one example, a greatest intensity achievable in an embodiment of a light engine for red light could be achieved by holding a mirror in the "ON" position for the entire time period during which the red filter is between the light source and the spatial modulator; a half intensity for red light could be achieved by oscillating the mirror such that it was in the "ON" position for half the time period the red filter is between the light source and the spatial modulator and in the "OFF" position the other half of the time period. It is noted that light engines sometimes do not allow projection of light through the spatial modulator during the entire time period during which each color filter is between the light source and the spatial modulator in order to facilitate better separation of colors by blocking projection of light during transition from one filter segment to the next.

Other systems may employ an array of light emitting diodes (LEDs), or lasers capable of scanning rays of light across the viewing surface, as their light engine. In a similar manner, hue, colorfulness and brightness are generally controlled by modulating the amount of power delivered of each primary color to a spot on the viewing surface corresponding to a location in the input image data.

In various embodiments, the viewing surface is modulated by zone in coordination with the light projected from the light engine to produce the desired image. For one embodiment, transitional areas may be included between zones to mitigate seams that may be visible if neighboring zones are set to significantly different levels of reflectivity or transmissivity.

The projection system may further include a coordinate alignment function for permitting a proper degree of spatial alignment between the coordinates of the projected image and the zones of the viewing surface. In one embodiment, a sensor system senses relative location between viewing surface elements and the spots of light from the light engine. The coordinate alignment function may occur at various times, e.g., at startup or upon detection of shaking and/or periodically. The alignment function may further be invoked manually, e.g., by a user of the projection system, or automatically.

FIG. 1 is a schematic of an embodiment of a projection system 100 in accordance with one embodiment of the present disclosure. The projection system 100 includes an image processing unit 102 for control and coordination of the shared light modulation between the light engine 104 and the display screen 1112. The image processing unit 102 receives incoming image data and provides control signals for the light engine 104 and, optionally, the viewing surface drive control 114 for modulation of the viewing surface 108 of screen 112.

The light engine 104 generally defines spots of light on the screen 112 by projecting rays of light, represented generally by dashed lines 106, onto viewing surface 108 of screen 112. The rays of light 106 generally are in either a fixed matrix pattern or are scanned across the viewing surface and are modulated in response to control signals received from the image processing unit 102. For a front-projection system, an image is viewable as light reflected from the viewing surface 108 of screen 112. For a rear-projection system, an image is viewable as light transmitted through screen 112 to viewing surface 110.

The screen 112 may include an array of screen elements (not shown in FIG. 1) that are controllable to be in an ON or white state (the highest degree of reflectivity that can generally be obtained for the embodiment of screen 112 used for front projection or the highest degree of transmissivity that can be obtained for the embodiment of screen 112 used for rear projection) or an OFF or black state (the highest degree of non-reflectivity that can be obtained for the embodiment of screen 112 used for front projection or the highest degree of non-transmissivity that can be obtained for the embodiment of screen 112 for rear projection). For another embodiment, the ON state may refer to the highest degree of reflectivity or transmissivity for a spectral range while the OFF state may refer to the highest degree of non-reflectivity or non-transmissivity for the spectral range. For example, in a front-projection system while red light is being projected, the ON state could refer to a state of the screen element having the highest reflectivity for red light and the OFF state could refer to a state of the screen element having the highest absorption of red light, noting that each color of light may have its own corresponding set of states. Viewing surface drive control 114 controls the modulation of the elements in response to control signals from the image processing unit 102. Note that while this embodiment is described with the image processing unit 102 controlling both the light engine 104 and the viewing surface drive control 114, the screen 112 could have its own image processing unit (not shown) for control of the viewing surface drive control 114 in response to image data independent of the image processing unit 102. While the various embodiments have been generally described in reference to the binary ON and OFF states of the elements for simplicity, it is noted that the various embodiments may also utilize elements capable of varying their states on a continuum between the ON and OFF states. For purposes of this disclosure, the term "continuum" may refer to a continuous analog variation between the ON and OFF states, or it may refer to discrete finite number of one or more states between the ON and OFF states. It is further noted that the term "element" relates to an addressable portion of the screen 112 and may not correspond to a discrete device.

Figure 2:
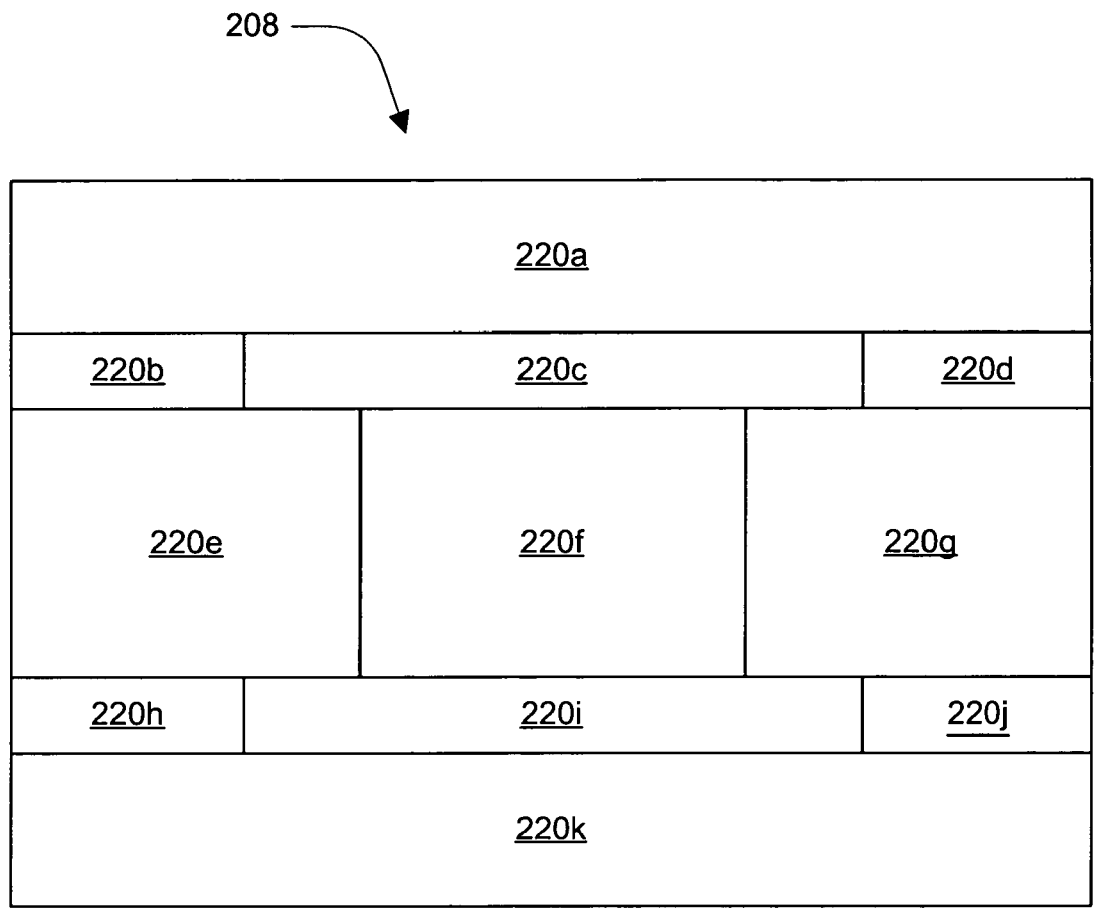
FIG. 2 is a schematic of an embodiment of a viewing surface for displaying an image in accordance with one embodiment of the disclosure.

FIG. 2 is a schematic of an embodiment of a viewing surface 208 for displaying an image in accordance with one embodiment of the disclosure. While the remainder of this disclosure will generally discuss the embodiments in terms of a front projection system, it will be understood that the concepts of the disclosure are equally applicable to rear projection systems by replacing references to reflectivity of the viewing surface to references to transmissivity of the viewing surface.

The example viewing surface 208 is depicted to have eleven (11) zones 220a-220k in FIG. 2. Zones 220 contain one or more elements of the viewing surface 208. Other numbers, sizes, shapes and arrangements of zones are possible, and the disclosure is not limited to any particular number, size, shape or arrangement of zones or elements. However, it is believed that a concentration of zones near the center of the viewing surface 208 will often lead to higher levels of image quality.

Each of the zones 220 is independently controlled for reflectivity. Reflectivity of each zone 220 is responsive to the image data received by the image processing unit, and may further be responsive to user input and viewing conditions. In general, if a portion of a zone 220 corresponds to a region of image data specifying a high brightness level, that zone's reflectivity should be higher. If the greatest specified brightness for a region of image data is less than a greatest light output of the embodiment of the light engine used, it is generally desirable to reduce the reflectivity of a zone 220. This will generally lessen the effect of ambient lighting conditions because the amount of ambient light reflected is reduced when the zone's reflectivity is reduced. Note that as the reflectivity of a zone 220 is reduced, the corresponding output power of the light engine, over the zone, would, in this embodiment, be increased to maintain the same or substantially the same brightness of the image resulting from projected light reflecting off the viewing surface 208 in that zone. The zones 220 of the viewing surface 208 may be either static or dynamic. That is, the number, size and arrangement of zones 220 may be fixed or they may be alterable, such as by user definition or definition by input image data. Furthermore, the number, size and arrangement of zones may be constant for a viewing experience or they may change during a viewing experience, such as scene-by-scene or other temporal basis.

Figure 2A:
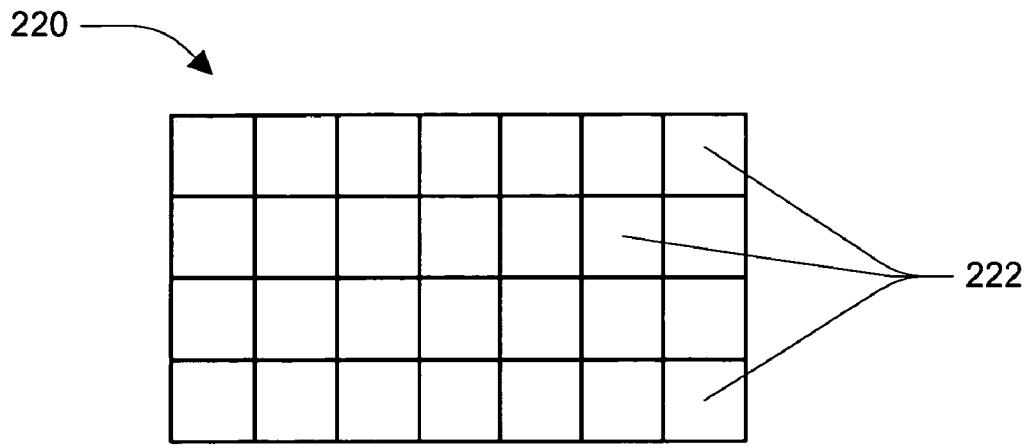
FIGS. 2A-2C are schematics of zones for projecting an image in accordance with embodiments of the disclosure.
Figure 2B:
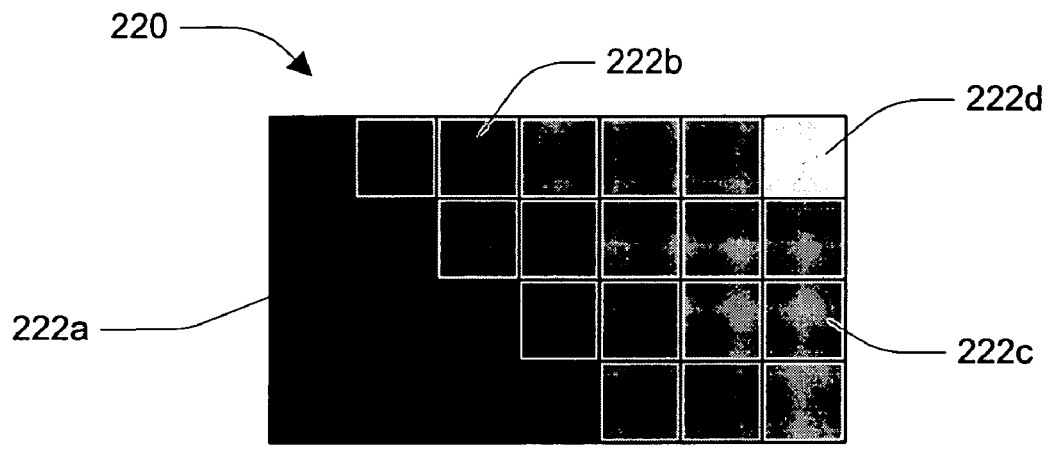
Figure 2C:
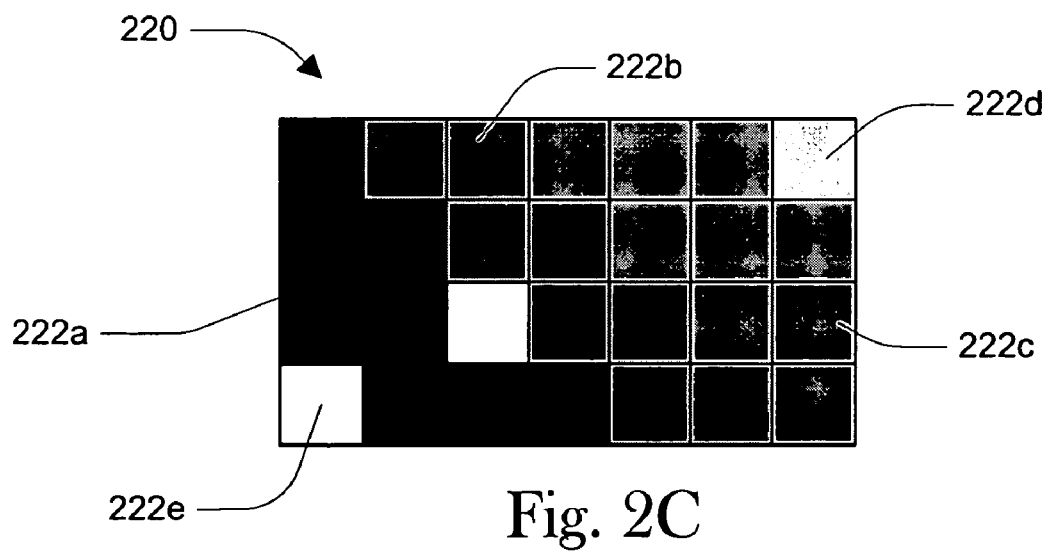

FIGS. 2A-2C are schematics of a zone 220 for projecting an image in accordance with embodiments of the disclosure. In FIG. 2A, zone 220 is depicted to have an array of elements 222. Elements 222 are generally the individual elements of the viewing surface and are the smallest unit of resolution of the viewing surface. In some embodiments, the viewing surface may have a higher resolution, i.e., more than one element per projected spot of light, than its corresponding light engine. If the resolution of the viewing surface exceeds the resolution of the projected image, the resolution of the reflected image presented to a viewer may be enhanced, relative to the projected resolution, and may most closely correlate with the resolution of the viewing surface. Note that a zone 220 in accordance with the disclosure may range from one element 222 of the viewing surface to all elements 222 of the viewing surface. Note further that the zones 220 of a viewing surface may be static, i.e., substantially constant during a viewing experience, or dynamic, i.e., changing in response to input image data, user input or ambient viewing conditions.

In FIG. 2B, an example of a desired image is shown with one or more first pixels 222a having a first brightness, one or more pixels 222b having a second brightness, one or more third pixels 222c having a third brightness and one or more fourth pixels 222d having a fourth brightness. For embodiments of the disclosure, reflectivity of a zone 220 may be determined in response to the brightest, or relatively greatest power, pixel desired to be displayed for the portion of an image corresponding to zone 220. Roughly, if the relatively greatest power pixel desired to be displayed for the portion of the image corresponding to zone 220 is 100% of the power output of the embodiment of the light engine used, the reflectivity of the zone 220 should be at its highest achievable value for zone 220 of the embodiment of viewing surface 208. If the relatively greatest power pixel desired to be displayed is 50% of the power output of the embodiment of the light engine used, the light engine could be set to 50% power with the reflectivity of the zone 220 set to 100% reflectivity. Alternatively, in utilizing the ambient light rejection capability of the embodiments, the reflectivity of the zone 220 could be reduced to approximately 50% of its highest achievable value for zone 220 while increasing the power output of the light engine to maintain the desired reflected image. In the example depicted in FIG. 2B, the reflectivity of the zone 220 could be determined in response to the desired brightness of the one or more pixels 222d, i.e., the pixels with the relatively greatest desired power output for that zone.

FIG. 2C is representative of input image data to show how noise might affect a resulting image. The representation of FIG. 2C is shown with one or more first pixels 222a having a first brightness, one or more pixels 222b having a second brightness, one or more third pixels 222c having a third brightness, one or more fourth pixels 222d having a fourth brightness and one or more fifth pixels 222e having a fifth brightness. The one or more fifth pixels 222e are likely the result of noise or other spurious signal and are not likely to be part of the desired image. These pixels 222e may be ignored in the analysis as to relatively greatest power using a degamma process or other filtering process to discard outliers. After filtering out pixels deemed to be undesirable, the reflectivity of the zone 220 in the example depicted in FIG. 2C could be determined, as with the example depicted in FIG. 2B, in response to the desired brightness of the one or more pixels 222d, i.e., the pixels deemed to have the relatively greatest desired power output for that zone. Although it is generally desirable to remove spurious pixels from the analysis, display of the part of the image in zone 220 may be accomplished suitably without this as the remaining pixels of the image would be generated having their desired brightness even though their corresponding zone would have a reflectivity higher than would be used were the spurious pixels not considered in the analysis. Note that for the examples depicted in FIGS. 2B and 2C, the brightness of the individual pixels 222 upon which the determination of relatively greatest power to be output is made may represent pixels as intended to be observed by a viewer or they may represent pixels of a particular primary color segment used to generate the observed pixels.

Reducing the reflectivity of the viewing surface allows for increased contrast (dynamic range) in the projector-screen system. Let I be the intensity (0%-100%) specified for an input image pixel. Let P be the illuminance (illuminance is proportional to projected intensity, but it is reduced as projection distance increases) of a spot of light produced by the projector, ranging between $P_{min}$ and $P_{max}$. Projected intensity, in practice, will not be reduced to 0 ($P_{min} > 0$ lm/m$^2$). Let R be the percentage of light reflected by a zone on the screen. Suppose R can be varied between 80% and 20%. In some embodiments of a screen, R is fixed for the entire screen surface, perhaps at a value of 95%. Let S be the intensity of light reflected at a spot on the screen. With no ambient light, the intensity of light reflected at a spot is proportional to the projected intensity times the reflectivity of the screen. Contrast ratio can be defined as the ratio of highest reflected intensity to lowest reflected intensity. For this embodiment of a first screen, the contrast ratio $C_{first}$ in the example is:

$$R = 0.95$$

$$C_{first} = k * P_{max} * R / k * P_{min} * R$$

$$C_{first} = P_{max} / P_{min}$$

but for a screen with adjustable reflectivity, such as an active screen, $C_{active}$ can be larger than $C_{first}$ because darker parts of the image can be reproduced on darker parts of the screen:

$$R_{max} = 0.8$$

$$R_{min} = 0.2$$

$$C_{active} = k*P_{min}*R_{max}/k*P_{min}*R_{min}$$

$$C_{active} = R_{max}/R_{min}*P_{min}/P_{min}$$

$$C_{active} = R_{max}/R_{min}*C_{first}$$

and in the example $R_{max}/R_{min}=4$, so the contrast ratio of the system with the active screen can be 4 times greater than the contrast ratio of the system with a screen having a fixed reflectivity, even though the greatest reflectivity achievable for a screen used in the system having an active screen may be less than the reflectivity of the system having a screen with the fixed reflection.

Ambient light can significantly reduce contrast ratio, but with an active screen, an increase in contrast ratio can be achieved in the presence of ambient light. With respect to a system using a screen with a fixed reflectivity in similar conditions, an active screen can increase contrast ratio by as much as $R_{max}/R_{min}$, independent of ambient light level.

Reflectivity of a zone 220 may be changed on a scene-by-scene basis, on a frame-by-frame basis, on a color sub-field-by-color sub-field basis or on some other temporal basis. Reflectivity of a zone 220 may further be changed in response to changes in viewing conditions, e.g., changes in ambient light, or in response to changes in user preferences. Appropriate adjustments in projected image intensity may be made in coordination with changes in the reflectivity of the viewing surface.

Figure 3:
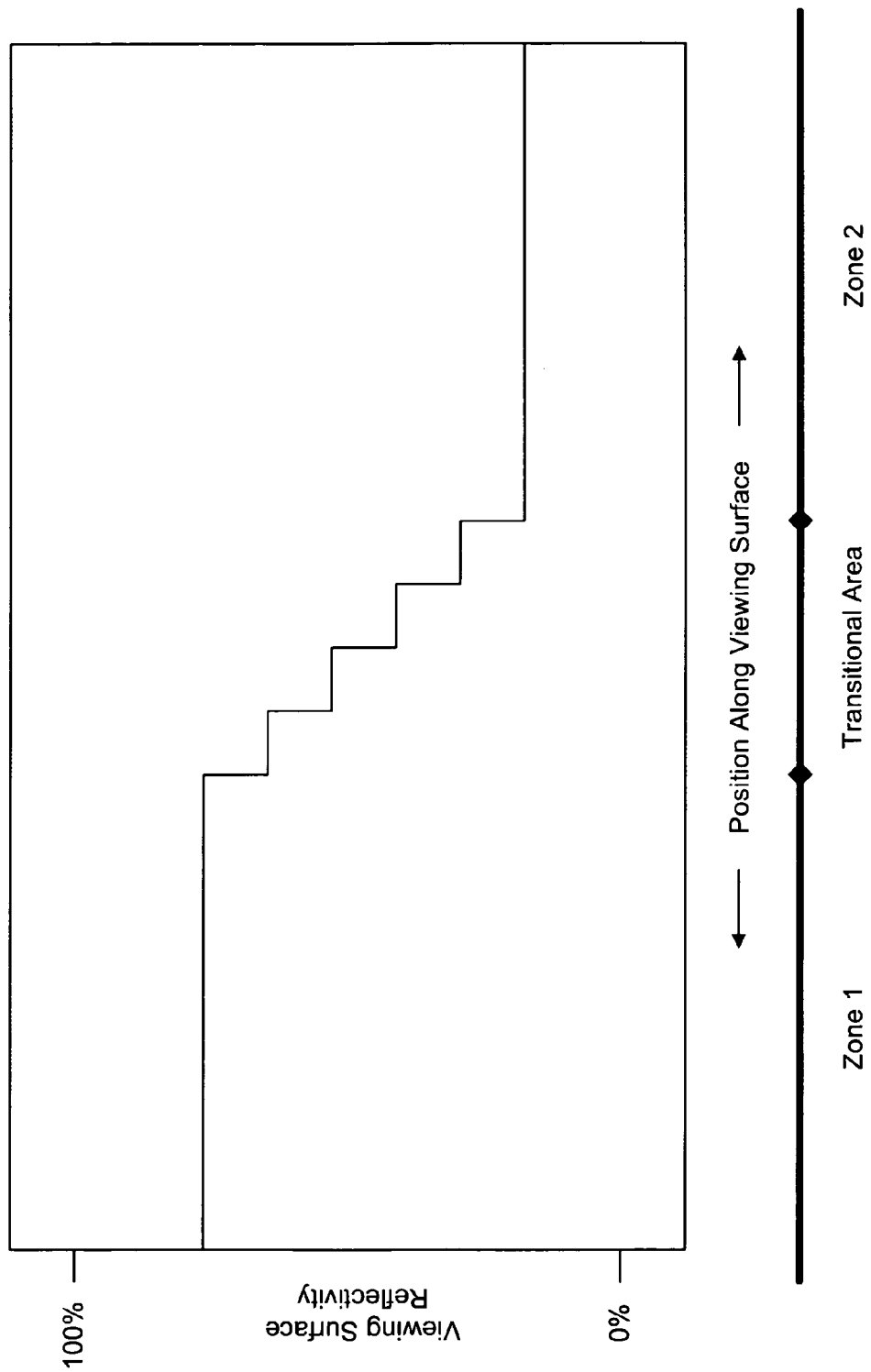
FIG. 3 is a graph depicting an embodiment of adjustment of reflectivity at the interface between two adjacent zones in accordance with one embodiment of the disclosure.

FIG. 3 is a graph depicting an embodiment of adjustment of reflectivity at the interface between two adjacent zones in accordance with one embodiment of the disclosure. As shown, a first zone, zone 1, may have a first reflectivity while a second zone, zone 2, may have a second reflectivity lower than the first reflectivity. To reduce the likelihood of visible seams between zones due to significant differences in desired reflectivity, a transitional area may be inserted between neighboring zones. The transitional area may be some number of elements interposed between zones. In a transitional area, the reflectivity could be gradually changed such that there is approximated a continuum of reflectivity levels between zones. In this manner, visible changes between zones may be reduced. For the transitional areas, output power of the light engine would be adjusted according to the reflectivity of the corresponding elements of the transitional area rather than the bulk reflectivity of the adjacent zones. Each step change in reflectivity may be representative of one or more elements of the viewing surface. Adjustment of the output power from the light engine corresponding to a transitional area can be performed using methodologies as described for zones 220. However, unlike zones 220 where power is substantially similar across the zone, the power within a transitional area will vary across the transitional area in conjunction with the changing reflectivity across the transitional area.

Figure 4:
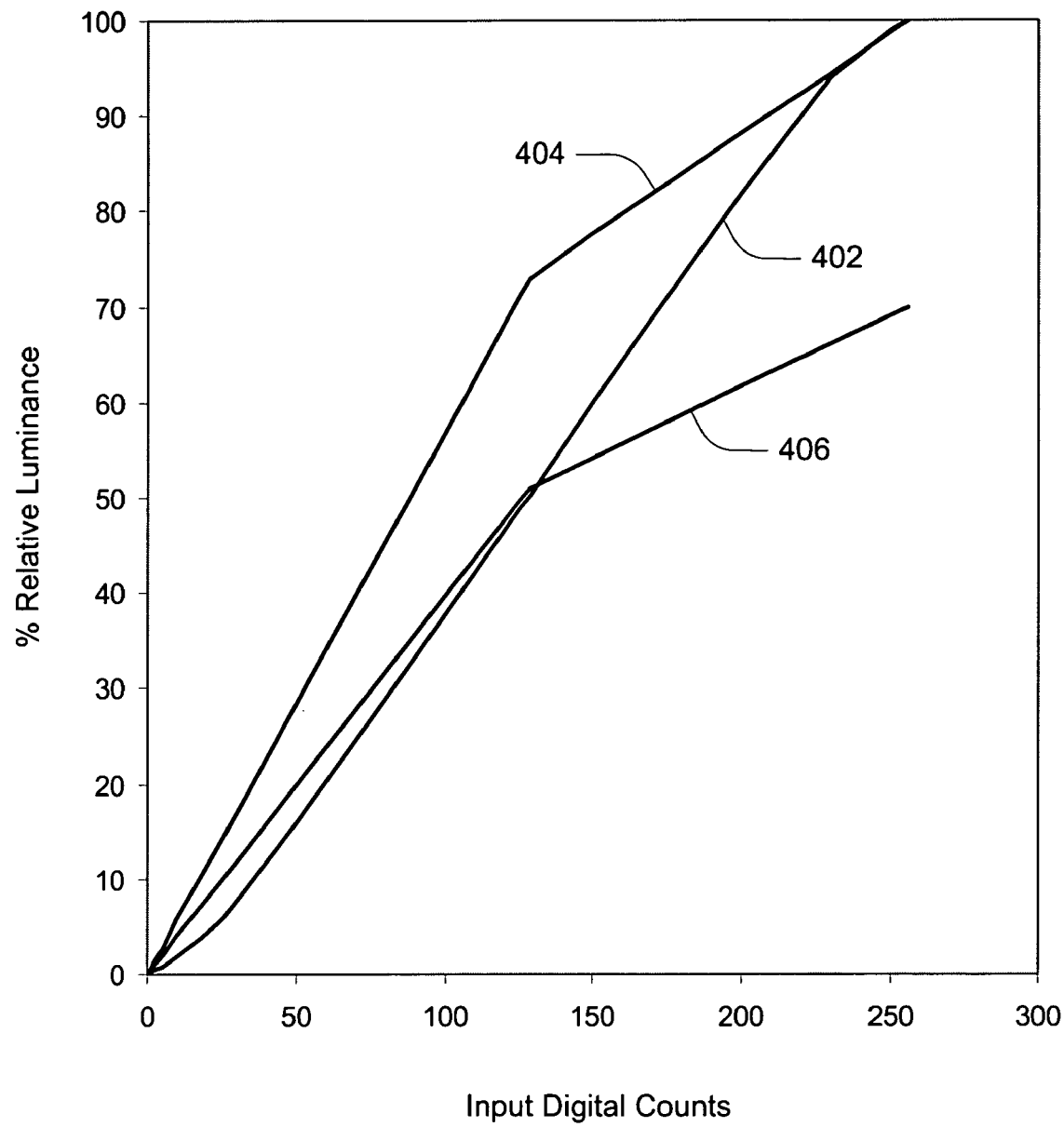
FIG. 4 is a graph depicting an embodiment of transfer function adjustment in accordance with one embodiment of the disclosure.

FIG. 4 is a graph depicting an embodiment of transfer function adjustment in accordance with one embodiment of the disclosure showing relative luminance, which provides a measure of projected luminous intensity as a function of image data, such as input image digital counts. Input digital counts express desired image brightness (luminance). In systems where screen reflectivity is constant luminance of the spots of light reflected by the screen is proportional to the luminous intensity of the rays of light leaving the projector and landing on those spots. However, for enhancements in perceived image quality, often the transfer function of the projector is altered such that the projected luminous intensity is not directly proportional to the input digital counts. Transfer functions generally adjust the actual luminous intensity output of the light engine as a function of the input image signal.

In FIG. 4, line 402 is a sigmoid transfer function, crowding highlights and shadows to achieve greater contrast in the mid tones. Such a transfer function 402 may be used with a viewing surface having constant reflectivity. Line 404 represents a transfer function for a light engine that may be used when a low-key image, e.g., average intensity is 75 counts, is identified to increase contrast in the darker parts of the image. Line 406 represents the reflected power, in relative luminance, resulting from the transfer function 404 if the viewing surface is reduced to 70% of its highest achievable reflectivity.

Figure 5A:
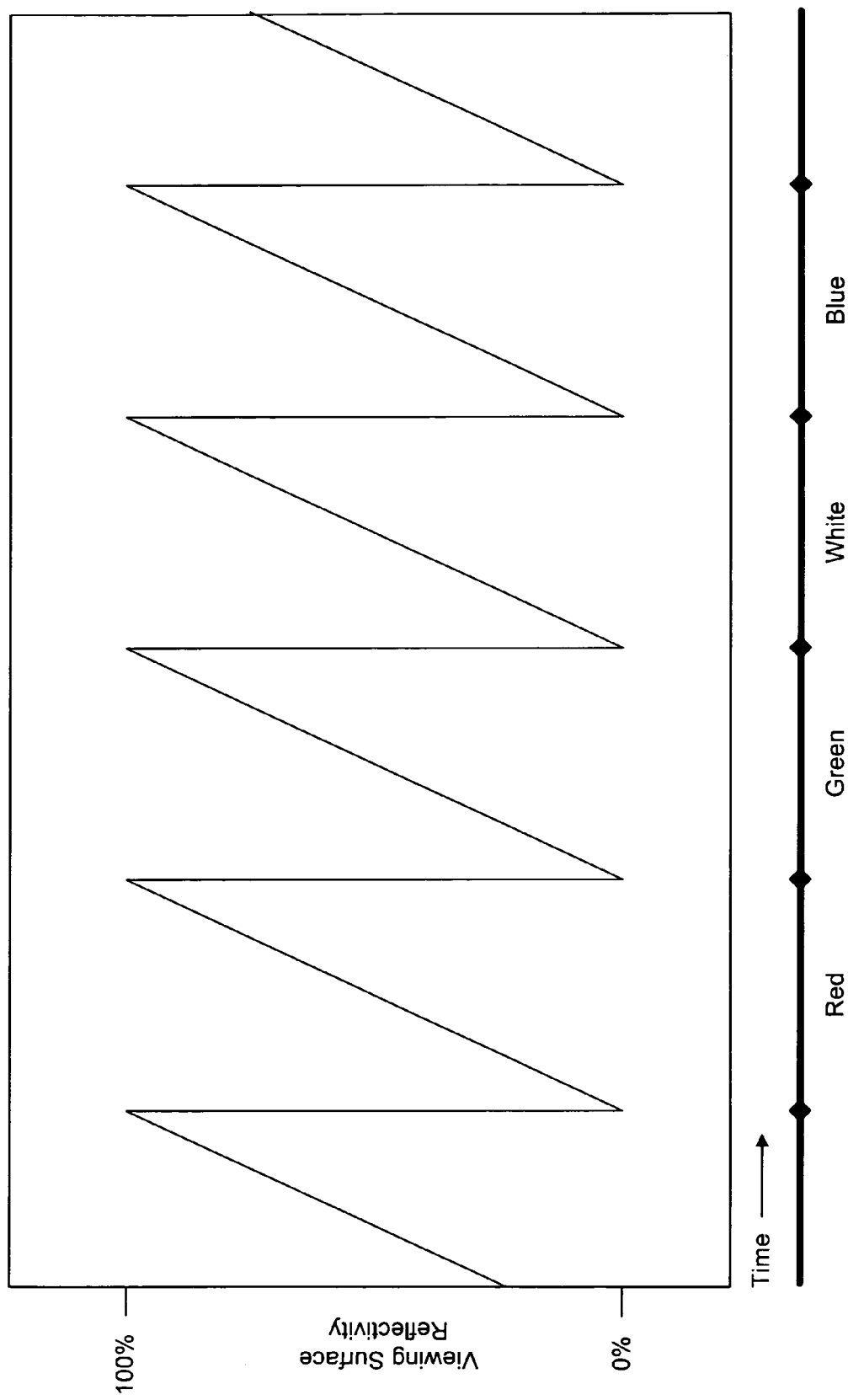
FIGS. 5A-5D are graphs depicting the reflectivity of an embodiment of a viewing surface in relation to color segments in accordance with various embodiments of the disclosure.
Figure 5B:
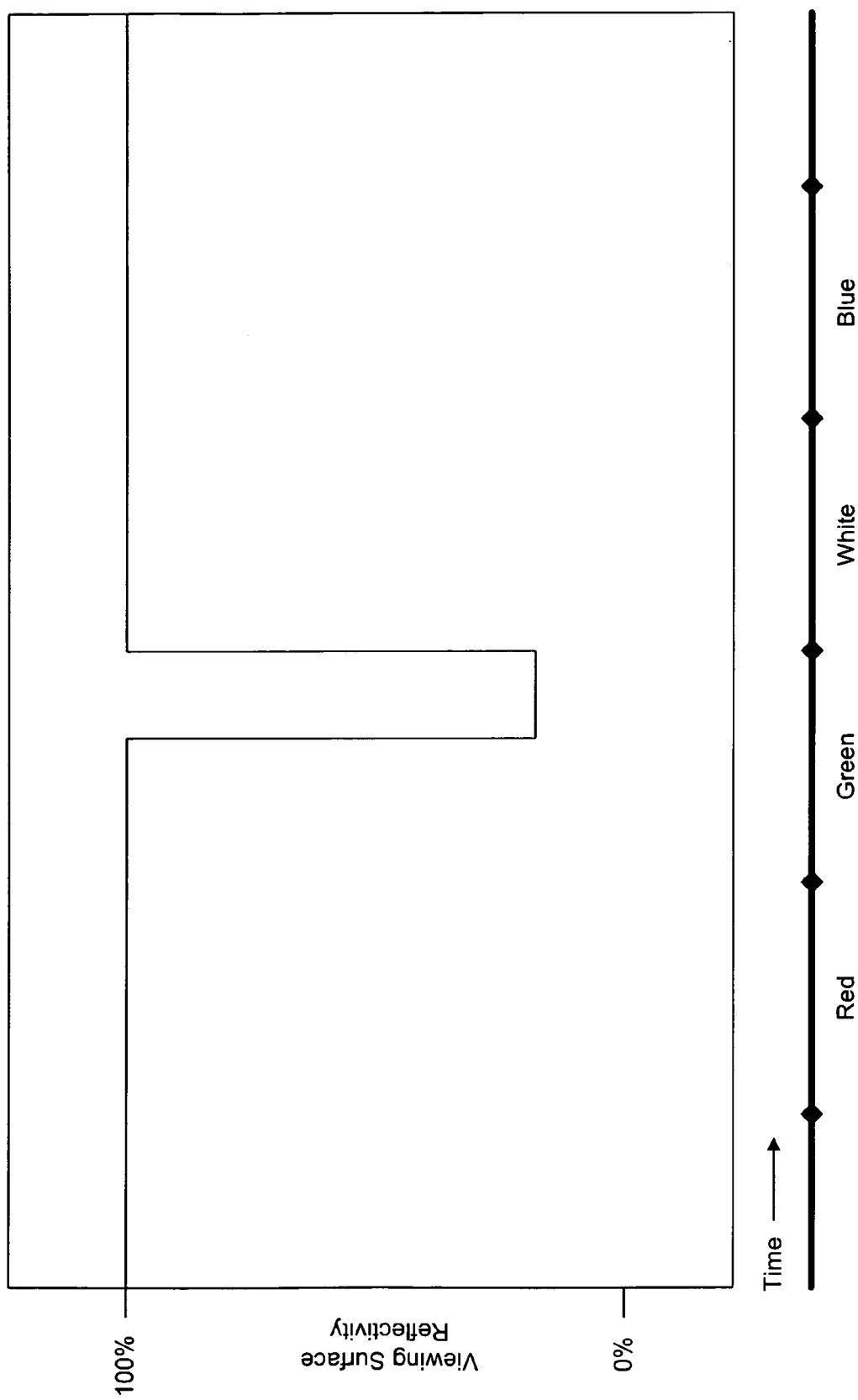
Figure 5C:
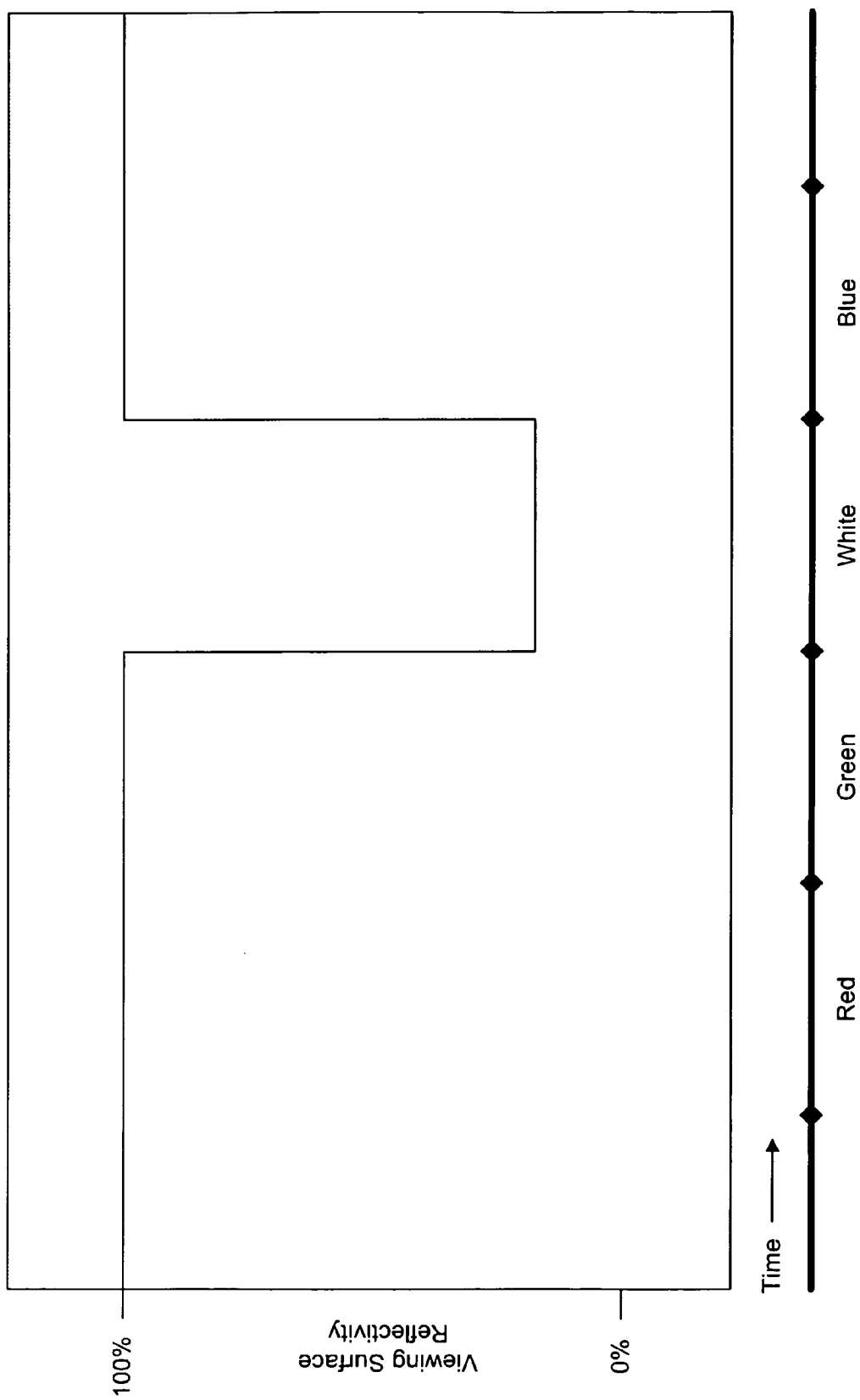
Figure 5D:
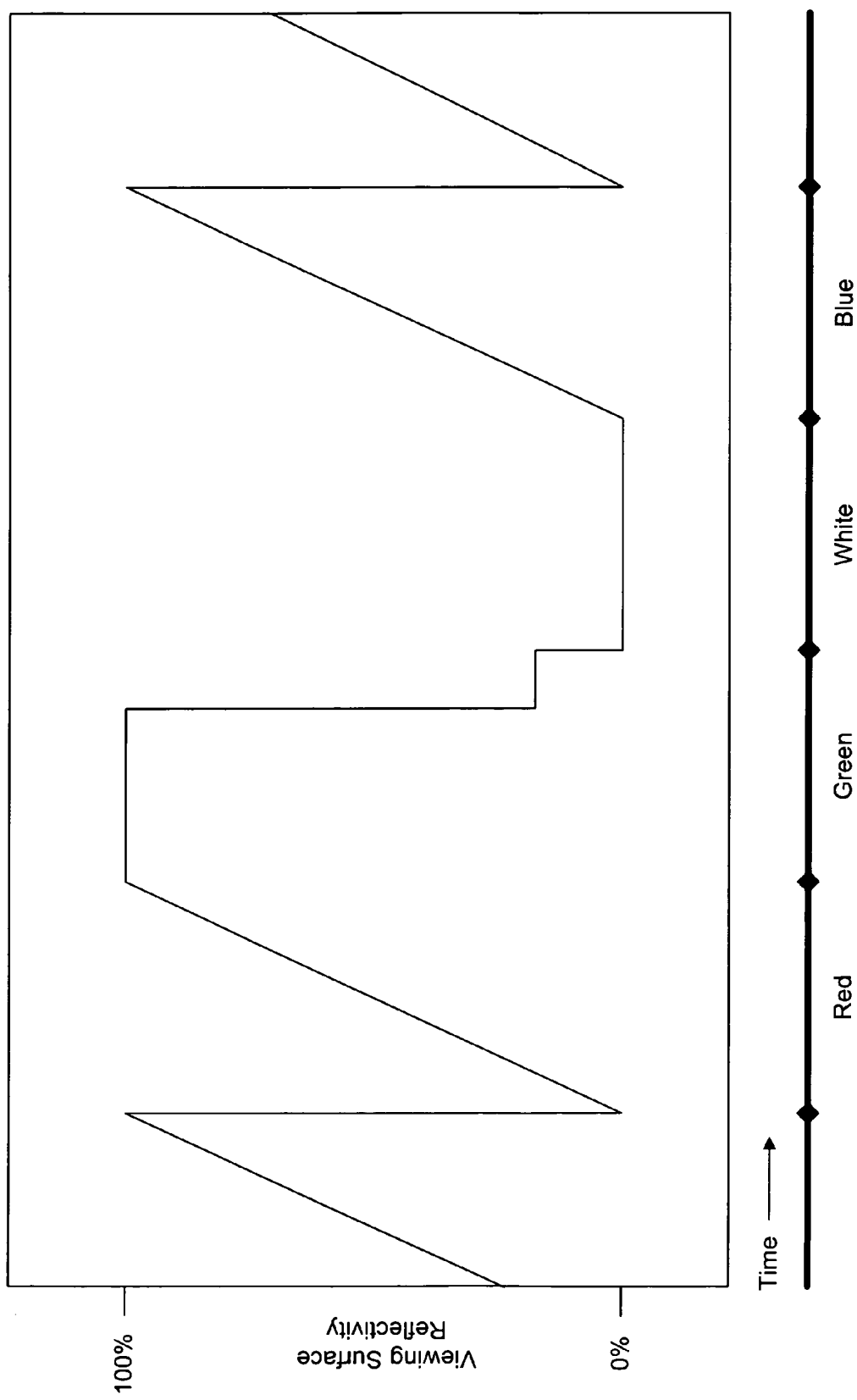

FIGS. 5A-5D are graphs depicting the reflectivity, over time, of an embodiment of a viewing surface in relation to sequentially projected color sub-fields in accordance with various embodiments of the disclosure. The reflectivity of an element may not be substantially constant throughout the desired time period corresponding to a color sub-field or scene. FIG. 5A is a graph depicting the reflectivity of a viewing surface in relation to color sub-fields in accordance with one embodiment of the disclosure. By slewing the reflectivity during each color sub-field, a reduced average reflectivity, such as a 50% reflectivity, may be produced. In addition, light projected during the portions of the sub-field when the screen reflectivity is very low results in very dim spots that are more difficult to see than spots produced on a screen with fixed reflectivity. If the projected image intensity is taken into account and controlled in coordination with the changing screen reflectivity, the precision with which the system can change the luminance of the output image is increased, thereby increasing the bit-depth of the display system, i.e., increasing the number of bits effectively defining the luminance of the output image. For example, if 8 bits are used to define the output power of the light engine, there can be 256 discrete levels of output power and, therefore, luminance of the output image if a reflectivity of the screen is constant. If a desired luminance is, for example, 50% of its greatest value, there might be 128 discrete levels of output power defining the luminance of the output image if a reflectivity of the screen is maintained at its greatest value. However, by reducing the reflectivity of the screen to 50% of its greatest value, the full bit depth of the light engine could be used to result in 256 discrete levels of reflected relative luminance between the values of 0% to 50%. In FIG. 5B, a substantially constant reflectivity is held across a scene with the exception of a portion of one color sub-field, in this example a portion of the green sub-field. In this manner, virtual darker sub-fields can be created, i.e., a perceived contribution of a sub-field can be reduced, without changes to the light engine. Again, system bit depth can be increased without modification to the light engine. Some field sequential projectors, e.g., Hewlett-Packard xb31, have a white segment on the color wheel than can optionally be used to increase luminous intensity output at the expense of color saturation. The user can adjust the projector to reduce light output to the lowest value allowed by the projector used during the white segment's time interval. As shown in FIG. 5C, if a filter segment is unused (so that light modulator output is reduced as indicated), the reflectivity of the screen can be reduced to its lowest achievable value of the screen used to reduce the amount of ambient light that reduces image contrast. This technique can be used when projector output is set to its lowest allowed value, such as during the transitions between filter wheel segments. In FIG. 5D it is shown that any number of variations may be used to produce a desired response. In all of these examples, the intensity of the projected image is adjusted to take into account the screen reflectivity at the time when the light is projected to achieve greater contrast.

Figure 6:
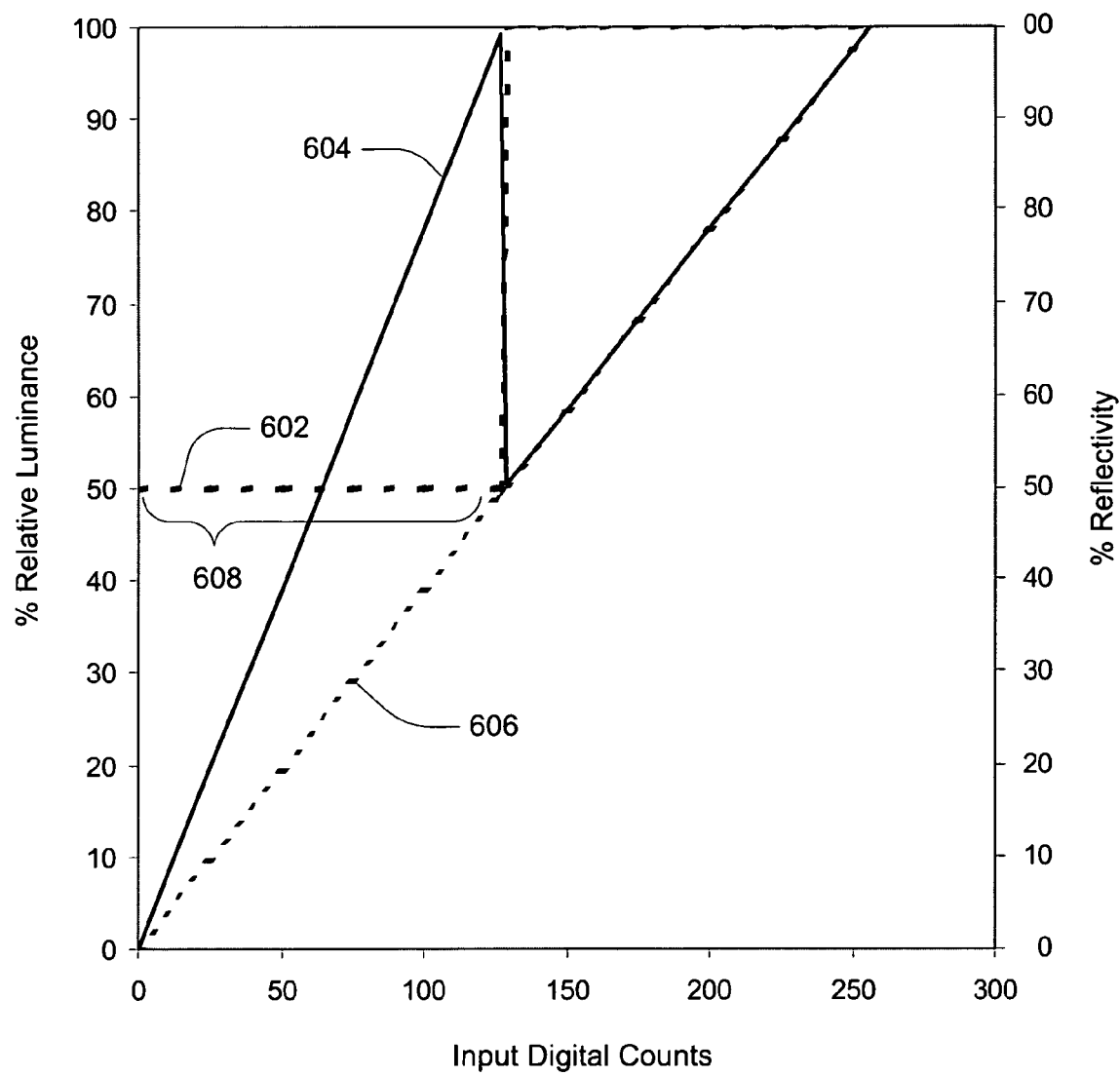
FIG. 6 is a graph depicting an embodiment of a transfer function in accordance with one embodiment of the disclosure.

FIG. 6 is a graph depicting an embodiment of a transfer function 604 in accordance with one embodiment of the disclosure showing a measure of projected power, in relative luminance, as a function of counts. In FIG. 6, the viewing surface reflectivity is assumed to have the capability to be changed between binary states, i.e., having one of two states of reflectivity. In the example of FIG. 6, the viewing surface is presumed to be at 50% reflectivity or 100% reflectivity, as depicted by line 602, and the desired reflected power, in relative luminance, is represented by line 606. By setting the viewing surface to its 50% reflectivity level for desired reflected power values of 50% relative luminance or less, and using the transfer function 604, the reflected power line 606 may be approximated. That is, by doubling the desired power output of the light engine (over a range of digital input counts 608 indicated in FIG. 6) and halving the reflectivity of the viewing surface, a reflected power of approximately the desired luminance (corresponding to a desired reflected luminance) may be attained. This increases the contrast of the viewable image, by reflecting 50% less ambient light over the range of digital input counts 608, which is desirable. It also increases bit depth by attenuating the amount of power provided by the projector to the screen by a factor of 2 at the low-end of the digital input counts (e.g. range of digital input counts 608) while using 100% of the range of the projector's output power.

The reflectivity of the viewing surface may have more than two states. While the foregoing example depicted a binary case, it will be readily apparent that this example can be extended to any number or granularity of reflectivity values.

Figure 7:
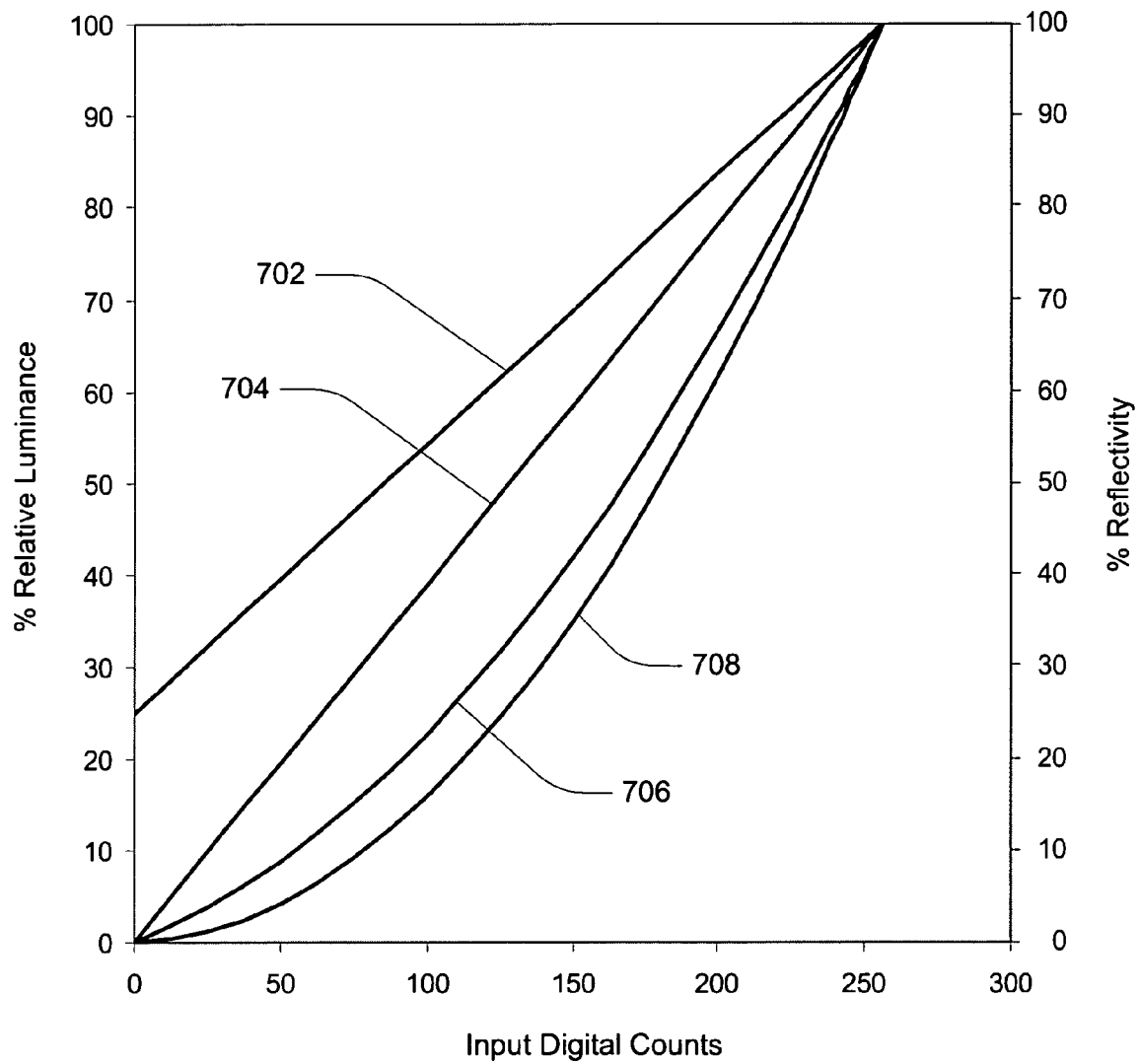
FIG. 7 is a graph depicting an embodiment of a transfer function in accordance with one embodiment of the disclosure.

FIG. 7 is a graph depicting an embodiment of a transfer function 704 in accordance with one embodiment of the disclosure showing projected power, in relative luminance, as a function of input digital counts. If the reflectivity of the viewing surface is variable, it could be set based on the input digital counts of the desired image brightness, for one embodiment, as represented by viewing surface reflectivity 702 as a function of the input digital counts. By utilizing a linear light engine output as a function of the input digital counts, as shown in transfer function 704, the system response, i.e., the reflected power 706, in relative luminance, displayed to a viewer can approximate the gamma function 708. In this manner, small changes in brightness in the dark parts of the image can be realized without reducing the light modulator's least significant bit (LSB) on-time or intensity level, thereby allowing use of more bit depth of the light modulator and reducing the impact of ambient lighting on the resultant image. The upstream image pipeline is adjusted accordingly to take into account the non-linear response 706. The overall system tone transfer function (not shown) could further account for ambient lighting, image content and/or user preferences. For example, reflectivity could be further reduced in conditions of high ambient lighting or reflectivity could be modified to affect color response differently at differing levels of intended luminance.

Figure 8:
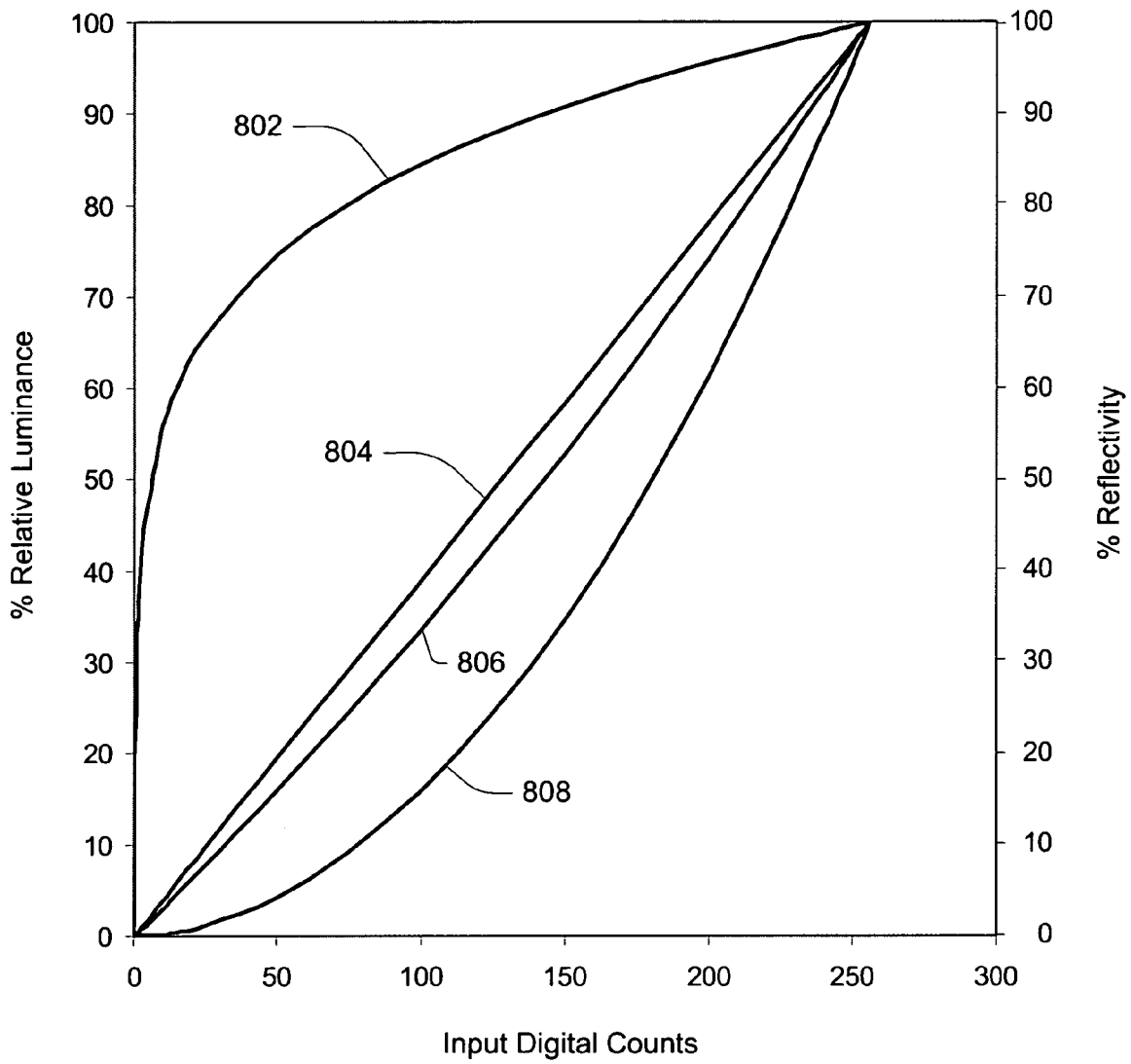
FIG. 8 is a graph depicting an embodiment of a transfer function in accordance with one embodiment of the disclosure.

FIG. 8 is a graph depicting an embodiment of a transfer function 804 in accordance with one embodiment of the disclosure showing projected power, in relative luminance, as a function of input digital counts. As discussed with reference to FIG. 7, if the reflectivity of the viewing surface is variable, it could be set based on the digital counts of the desired image brightness for one embodiment as represented by viewing surface reflectivity 802. However, in FIG. 8, viewing surface reflectivity 802 is non-linear such that viewing surface reflectivity drops sharply for darker images. By utilizing a linear light engine output of transfer function 804, the system response, i.e., the relative luminance of the reflected power 806, becomes more linear than the gamma function 808. In this embodiment, the upstream image pipeline may avoid adjusting for a non-linear response. Again, however, the overall system tone transfer function (not shown) could further account for ambient lighting, image content and/or user preferences.

While the foregoing determination of highest desired power and adjustment of viewing surface reflectivity can be performed on a frame-by-frame basis substantially concurrently with the receipt of the incoming image data when sufficient processing speed is available, it may be desirable to take into account response times for the projection sub-system and the screen sub-system when generating control signals for one or the other. This can include buffering to induce a delay between the incoming video feed and the subsequent projection of light corresponding to that feed in order to allow time for the screen elements to respond and/or buffering to delay audio to keep it synchronized with the projected images. This may further include averaging the desired reflectivity per frame over a time compatible with a response in the screen elements or it may include root mean squared (RMS) type signal averaging. Prediction of expected reflectivity based on a rate of change may also be used to achieve greater visual fidelity. Other forms of buffering or other variable delay between processing and projection may also be included.

Figure 9:
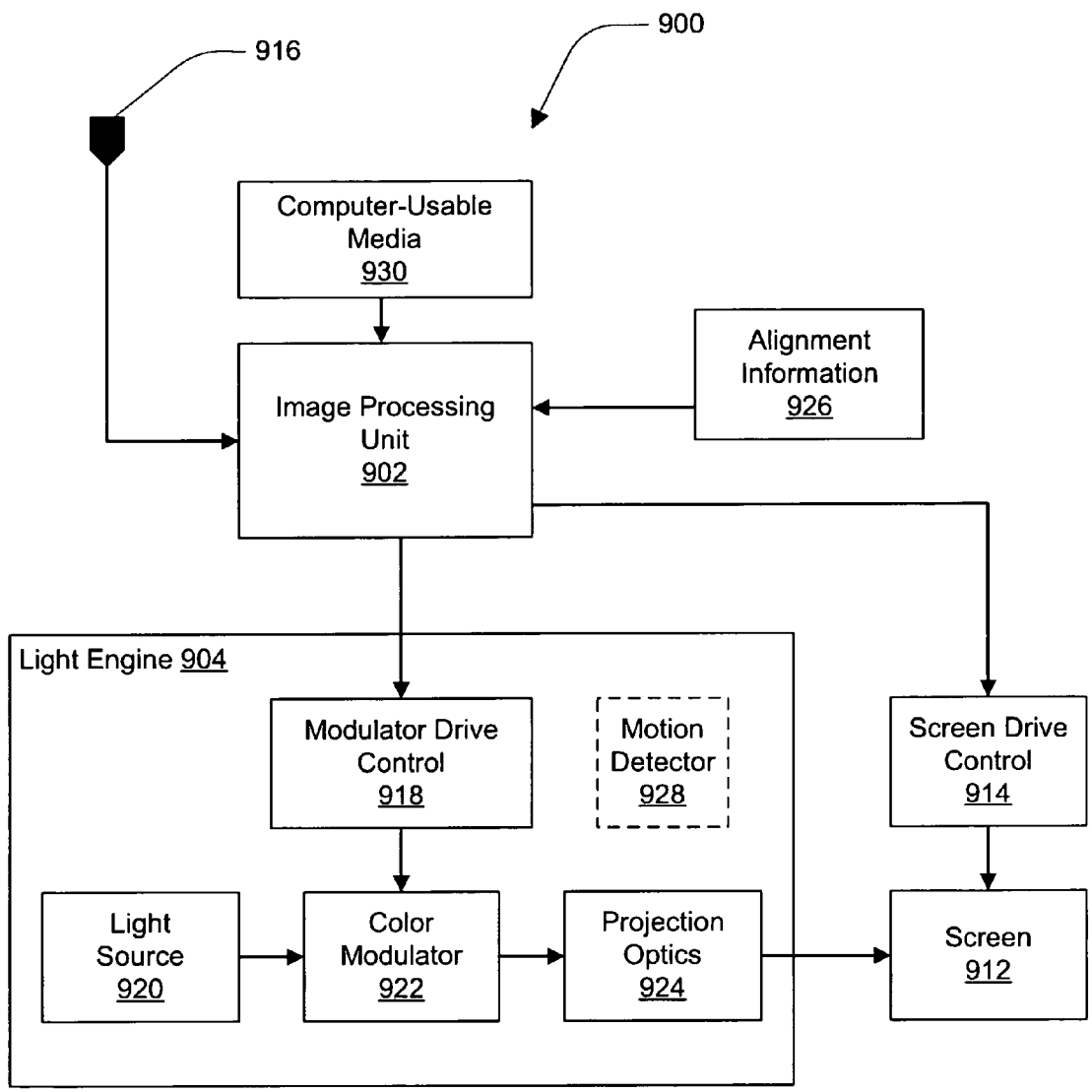
FIG. 9 is a schematic of an embodiment of a projection system in accordance with a further embodiment of the disclosure.

FIG. 9 is a schematic of an embodiment of a projection system 900 in accordance with a further embodiment of the present disclosure. Projection system 900 typically includes a light engine 904 having a light source or illumination source 920 configured to direct light along an optical path or light path toward screen 912. Light source 920 may be any suitable device configured to generate light that can be directed toward screen 912. For example, light source 920 may be a single light source, such as a mercury lamp or other broad-spectrum light source. Alternatively, light source 920 may include multiple light sources, such as light emitting diodes (LEDs), lasers, etc.

Light generated from light source 920 further may be directed onto a color modulator 922. Color modulator 922 may be a spatial light modulator, such as a micromirror array, a color filter and/or a multi-colored light source. The color modulator 922 generates colored rays of light for projection on the screen 912 as spots of light. The color modulator 922 controls the average hue, colorfulness and brightness for the light spot for a given frame period or sub-field.

For some embodiments, the color modulator 922 is integral with the light source 920. Alternatively, the color modulator 922 may be independent of the light source 920. Regardless of the configuration, the combination of a light source and a color modulator produces the color light array for projection of the output image.

Projection system 900 may further include a modulator drive control 918 configured to manage generation of the projected image from the light engine 904 in response to control signals from the image processing unit 902. Light emitted from the light source 920 is modulated by color modulator 922, as directed by modulator drive control 918, and passed through projection optics 924 onto screen 912. Projection optics 924 may include one or more projection lenses. Typically, projection optics 924 are adapted to focus, size, and position the output image on screen 912. Optionally, a motion detector 928, such as an accelerometer, may be included to detect movement of the light engine 904. When movement is detected, alignment of the projection system could be invoked automatically to maintain appropriate alignment between the light engine 904 and the screen 912. Alignment of the projection system is described with reference to FIG. 10 herein.

In operation, image data 916 for a desired image is received by the image processing unit 902. The image processing unit 902 generates control signals for use by the light engine 904 and screen drive control 914 such that the light engine 904 will be directed to project the spots of light having the appropriate hue, colorfulness and brightness and the modulated screen 912 will be directed to correspondingly modulate its elements to the desired reflectivity to approximate the desired output image on the screen 912. The screen 912 provides an ON or OFF state on a per element basis. When a given element is ON, then the surface of the associated element is reflective, as explained previously in the case of a front-projection system, or transmissive, as explained previously in the case of a rear-projection system. When a given element is OFF, then the surface of the associated element is black or non-reflective as explained previously, in the case of a front-projection system, or opaque or non-transmissive as explained previously, in the case of a rear-projection system. As noted previously, the elements of screen 912 may further assume states, i.e., levels of reflectivity or transmissivity, between their ON and OFF states and the control circuit would generate control signals specifying the desired level of reflectivity or transmissivity.

It will be recognized that reasonable alignment of a projected spot of light and its corresponding element(s) of screen 912 is useful to accomplish the shared light modulation between the light engine 904 and the screen 912. Accordingly, manual or automated alignment information 926 is provided to image processing unit 902 to facilitate such alignment of the projected light and its corresponding element(s) of screen 912. The alignment information 926 represents some indication, described in more detail below, to permit the image processing unit 902 to determine which elements of screen 912 correspond to a given spot of light from the light engine 904. For one embodiment, the alignment information 926 is derived from sensors embedded within screen 912 responsive to light coming from the light engine 904. For another embodiment, the alignment information 926 is derived from a CCD device, CMOS device or other light-sensitive sensor responsive to the output image on screen 912.

While the various functionality of the projection system 900 is depicted as corresponding to discrete control entities, it is recognized that much of the functionality can be combined in a typical electronic circuit or even an application-specific integrated circuit chip in various embodiments. For example, the functionality of the image processing unit 902 and the screen drive control 914 could be contained within the light engine 904, with the light engine 904 directly receiving the image data 916 and providing a control output to the screen 912. Alternatively, the screen drive control 914 could be a component of the screen 912. In addition, the screen 912 could include its own image processing unit responsive to image data 916 such that the screen 912 and the light engine 904 could independently respond to the image data 916. Furthermore, the control signals for the screen drive control 914 may not be provided through a control output. For example, control signals could be provided to screen drive control 914 through some form of wireless communication, such as infra-red (IR) or radio frequency communication.

It is noted that the image processing unit 902 may be adapted to perform the methods in accordance with the various embodiments in response to computer-readable instructions. These computer-readable instructions may be stored on a computer-usable media 930 and may be in the form of either software, firmware or hardware. In a hardware solution, the instructions are hard coded as part of a processor, e.g., an application-specific integrated circuit chip. In a software or firmware solution, the instructions are stored for retrieval by the processor. Some additional examples of computer-usable media include read-only memory (ROM), electrically-erasable programmable ROM (EEPROM), flash memory, magnetic media and optical media, whether permanent or removable.

Figure 10:
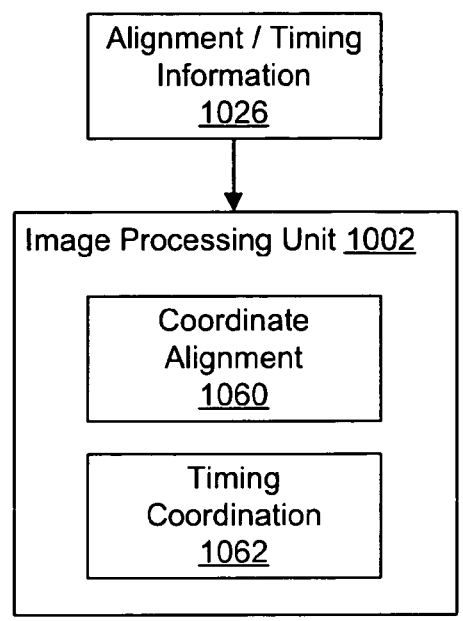
FIG. 10 is a schematic of an embodiment of an image processing unit in accordance with another embodiment of the disclosure.

FIG. 10 is a schematic of an embodiment of an image processing unit 1002 in accordance with another embodiment of the present disclosure. The image processing unit 1002 includes a pixel coordinate alignment function 1060 for facilitating proper spatial alignment between the coordinates of each of the light engine and the viewing surface, in response to alignment/timing information 1026. In one embodiment, a sensor system senses relative location between viewing surface elements and the spots of light from the light engine. In another embodiment, a perceived image from the screen is detected by a CCD device, CMOS device or other light-sensitive sensor and compared to an expected image to determine the relative location between viewing surface elements and the spots of light from the light engine. The coordinate alignment function 1060 may be invoked at various times, e.g., at startup or upon detection of shaking and/or periodically. The alignment function may further be invoked manually, e.g., by a user of the projection system, or automatically.

The image processing unit 1002 further includes a timing coordination function 1062 to facilitate accurate synchronization between light signals from the light engine and the viewing surface elements in response to alignment/timing information 1026. If the screen and the light engine share the same frame buffer, this system timing function may simply be sending the buffered information to the light modulators (viewing surface and light engine) at the correct time. In one embodiment, a sensor system senses relative timing between viewing surface elements and the spots of light from the light engine. In another embodiment, the output image is detected by a CCD device, CMOS device or other light-sensitive sensor and compared to an expected image to determine the relative timing between viewing surface elements and the spots of light from the light engine. The timing coordination function 1062 may be invoked at various times, e.g., at startup or upon detection of flicker and/or periodically. The coordination function may further be invoked manually, e.g., by a user of the projection system, or automatically. The image processing unit 1002 may adjust the timing of the light projected from the light engine to coordinate with timing of the screen elements, the timing of the screen elements to coordinate with the timing of the light projected from the light engine, or some combination of the two. Additionally, the timing coordination function 1062 could include video buffering anticipation algorithms for adjusting reflectivity relative to a rate of change in desired image intensity.

Figure 11:
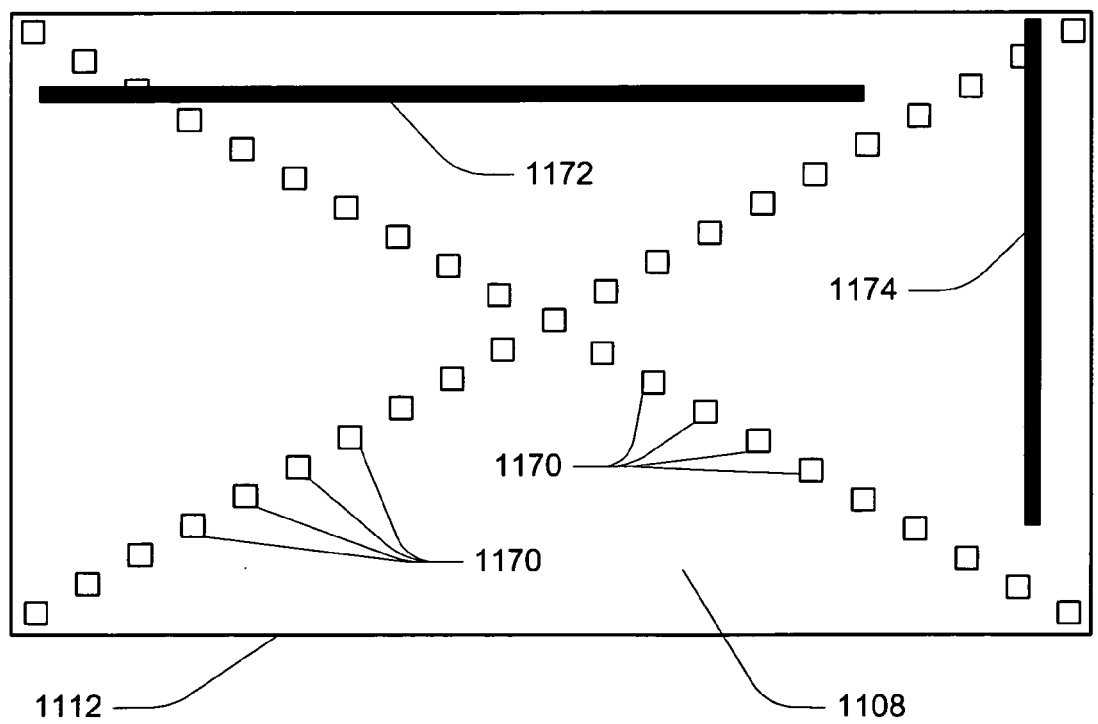
FIG. 11 is a schematic of an embodiment of a display screen and sensors for describing alignment and timing of light source and screen element modulation in accordance with an embodiment of the disclosure.

FIG. 11 is a view of an embodiment of a display screen 1112, normal to its viewing surface 1108, and sensors 1170 for describing alignment and timing of projected image and screen element modulation in accordance with an embodiment of the present disclosure. The sensors 1170 may be embedded within the display screen 1112 to detect incident light. Alternatively, the sensors 1170 may represent a CCD device, CMOS device or other light-sensitive sensors, external to display screen 1112, for detecting light reflected from or transmitted through the viewing surface 1108. Such external sensors could be a component of the light engine.

While the sensors 1170 are depicted to be in a crossed pattern, other patterns may be utilized consistent with the disclosure. Furthermore, while substantially all of the viewing surface 1108 is encompassed by the sensors 1170, in some embodiments this may not be the case. In the extreme case, one sensor 1170 could be utilized to detect a horizontal and/or vertical position of a projected spot of light. Two sensors 1170 would allow for determining rotation issues. However, the inclusion of additional sensors allows for ease of determining the location of a projected image and an accuracy of any adjustments. For one embodiment, sensors 1170 may be included outside the illuminated image area that would be stimulated when the projector overscans for the purpose of alignment.

As one example, vertical alignment can be determined by projecting a horizontal stripe 1172, such as multiple adjacent spots of light or a scan of a single spot of light, on the viewing surface 1108. Based on where the horizontal stripe 1172 is detected by sensors 1170, its location relative to the viewing surface 1108 may be determined. Detection of the horizontal stripe 1172 by two or more sensors can provide a degree of rotation of the horizontal stripe 1172. If the horizontal stripe 1172 is not detected in its expected location and rotation, the coordinate alignment function 1060 of the image processing unit 1002 can make appropriate corrections such that the horizontal stripe 1172 will be projected in its expected location.

In a similar manner, horizontal alignment can be determined by projecting a vertical stripe 1174, such as multiple adjacent spots of light or a scan of a single spot of light, on the viewing surface 1108. Based on where the vertical stripe 1174 is detected by sensors 1170, its location relative to the viewing surface 1108 may be determined. Detection of the vertical stripe 1174 by two or more sensors can provide a degree of rotation of the vertical stripe 1174. If the vertical stripe 1174 is not detected in its expected location and rotation, the coordinate alignment function 1060 of the image processing unit 1002 can make appropriate corrections such that the vertical stripe 1174 will be projected in its expected location.

As another example, for external sensors 170, horizontal stripes 172 and vertical stripes 1174 are projected and scanned across display screen 1112. By placing limited rows of screen elements in the ON state, individual horizontal stripes 1172 will be perceived when crossing a row of the elements in the ON state. The set of ON elements can be changed and analyzed by additional projection of individual horizontal stripes 1172. Timing of when a horizontal stripe 1172 or vertical stripe 1174 is perceived provides information regarding which projected horizontal stripe 1172 or vertical stripe 1174 aligns with the active screen elements, thus providing alignment information. For another embodiment, where external sensors 1170 are utilized, one of the light engine and screen could be set to a uniform state while a pattern is induced by the other. For example, the light engine could project substantially the same hue, colorfulness and brightness for each spot of light while the screen modulates its elements to produce some pattern of differing reflectivity. The process could then be repeated, to set the other one of the light engine or the screen to a uniform state while the same pattern is induced by the other. In this manner, alignment information could be determined from any offset in the image perceived by the external sensors 1170. While examples have been provided for determining and correcting alignment, the subject matter of the present disclosure is not limited to any particular alignment technique. For example, alignment information could be generated in response to generating other detectable edges such as circles or other patterns or input from a user.

Regardless of how alignment is determined, alignment allows a lookup table to be generated or a coordinate shift to be defined that defines a location for each screen element in relation to positions of the spots of light in the output image. In this manner, screen elements can be associated with their corresponding spots of light such that the reflectivities of the viewing surface elements and power output of the light engine can function cooperatively as described above.

For embodiments where the screen and the light engine do not share the same frame buffer, timing adjustments can be made using the same sensors 1170 used for alignment detection. As an example, a periodic projection of light, e.g., a flashing horizontal stripe 1172, vertical stripe 1174, a spot of light or entire illumination of the viewing surface 1108, can be detected by embedded sensors 1170 and used to align the timing of the light engine and viewing surface 1108. Similarly, for external sensors 1170, periodically cycling the elements between the ON state and OFF state with a steady illumination of the viewing surface can be detected by the external sensors 1170 and used to align the timing of the light engine and screen 1108. It is further noted that sensors 1170 could be used to generate ambient light information for use by the image processing unit in determining reflectivity of the viewing surface in accordance with embodiments of the disclosure, e.g., permitting an increase in the output power of the light engine and a corresponding decrease in the reflectivity of elements of the viewing surface in areas of high ambient light conditions.

What is claimed is:

1. An apparatus, comprising:
 a light engine to project light onto elements capable of changing states; and
 a processing unit configured to cause the light engine to adjust an intensity of the light in response to input image data and to data indicating the states for the elements upon which the light is to be projected;
 wherein the data indicating the states for the elements is different than the input image data.

2. The apparatus of claim 1, wherein the elements are included in a surface having two or more zones and wherein the elements of the surface are addressable to individually control their states.

3. The apparatus of claim 2, wherein the surface further includes at least one transitional area, the at least one transitional area interposed between a first zone and a second zone, wherein states of elements of the at least one transitional area approximate a continuum of values between a value of the state of elements of the first zone and a value of the state of elements of the second zone.

4. The apparatus of claim 2, wherein a number, size and arrangement of the zones of the surface is static or dynamic.

5. The apparatus of claim 2, wherein the processing unit is further adapted to determine a greatest desired power for one or more zones of the addressable elements, to modulate the addressable elements of the viewing surface by zone and to modulate light projected from the light engine in coordination with the states of the addressable elements of the viewing surface for each zone.

6. The apparatus of claim 2, wherein the processing unit is further configured to cause the elements to change the states for each zone in response to a desired output image corresponding to its respective zone and to adjust an output power from the light engine according to the desired output image and the states of the elements for each zone.

7. The apparatus of claim 1, wherein the processing unit is configured to cause the elements to change between ON and OFF states.

8. The apparatus of claim 7, wherein the processing unit is configured to cause the elements to vary their states to include additional states between the ON and OFF states and wherein the ON and OFF states for a first spectral range are different than the ON and OFF states for a second spectral range.

9. The apparatus of claim 1, wherein the processing unit is further adapted to receive alignment information to adjust an alignment of the light projected from the light engine and to adjust an alignment of the light projected from the light engine automatically and/or in response to a user input.

10. The apparatus of claim 1, wherein the processing unit is further adapted to receive timing information to adjust a timing of light projected from the light engine and/or a timing of changing the states of elements of the surface.

11. The apparatus of claim 1, further comprising a motion detector coupled to the light engine or the surface, wherein the processing unit is further adapted to adjust an alignment of light projected from the light engine in response to detecting movement by the motion detector.

12. The apparatus of claim 1, wherein the processing unit is further adapted to provide a variable delay in projecting the light to adjust based upon a response time of the elements of the surface.

13. The apparatus of claim 1, wherein the processing unit is further adapted to provide video buffering anticipation for adjusting the states of an element of the surface relative to an expected rate of change in an intensity of spots of light corresponding to that element.

14. The apparatus of claim 1, wherein the states of the elements are states of reflectivity or states of transmissivity.

15. The apparatus of claim 1, wherein the states of the elements are changeable on a scene-by-scene basis, a frame-by-frame basis, or a color sub-field-by-color sub-field basis, or changeable within a time interval of a color sub-field.

16. The apparatus of claim 1, wherein the data indicating the states for the elements includes a function of the input image data.

17. The apparatus of claim 16, wherein the input image data is representative of a desired luminance of an output image.

18. The apparatus of claim 16, wherein the states of the elements have a first value for a first range of the input image data and a second value for a second range of the input image data.

19. The apparatus of claim 16, wherein the states of the elements vary linearly with the input image data or non-linearly with the input image data.

20. A projection system, comprising:
a light engine for projecting spots of light at a first resolution and at a variable output power;
a viewing surface having screen elements at a second resolution; and
an image processing unit to adjust the output power of the light engine according to input image data and to data specifying states for the screen elements;
wherein the data specifying states for the screen elements is different than the input image data.

21. The projection system of claim 20:
wherein the viewing surface has two or more zones;
wherein the image processing unit is adapted to place each screen element of a zone in substantially the same state; and
wherein the states of screen elements of a zone are independent of the states of screen elements of other zones.

22. A method, comprising:
changing states of elements of a surface according to image data; and
projecting light having an intensity based on the image data and the data indicating the states for the elements;
wherein the data indicating the states for the elements is different than the image data.

23. The method of claim 22, further comprising:
determining a greatest desired power of a first zone of a desired image;
determining a greatest desired power of a second zone of the desired image;
changing states of elements of a first zone of the surface in response to the greatest desired power of the first zone of the desired image;
changing states of elements of a second zone of a surface in response to the greatest desired power of the second zone of the desired image;
generating light spots of more than one color at an output power based on the image data and data indicating the states of the elements of the first and second zones of the surface; and
projecting the light spots on the elements of the first and second zones of the surface.

24. The method of claim 22, wherein projecting light on elements of the viewing surface further comprises modulating the intensity of a light source.

25. The method of claim 22, wherein changing states of the elements further comprises changing a reflectivity or transmissivity of the elements independently for more than one spectral range.

26. The method of claim 22, further comprising:
aligning spots of the light with a corresponding set of elements, wherein aligning the light spots with a corresponding set of elements further comprises generating a lookup table or a coordinate shift to associate each light spot with a corresponding one or more elements that can be illuminated by that light spot.

27. The method of claim 22, further comprising:
adjusting a timing of spots of the light with a modulation of a corresponding set of elements.

28. An apparatus, comprising:
means for generating light spots of different colors on at least first and second zones of a viewing surface in response to portions of a desired image corresponding to each of the zones;
means for changing states of elements of the viewing surface for at least the first and second zones in response to the portions of the desired image corresponding to each of the zones; and
means for coordinating the means for generating light spots and means for changing states of elements of the viewing surface to display a projected image representative of the desired image in at least the first and second zones;
wherein the means for coordinating is further configured to adjust the means for generating light spots in response to data indicating the states of the elements of the viewing surface for each of the zones.

29. The apparatus of claim 28, wherein the means for generating light spots of different colors further comprises means for modulating at least an intensity or brightness of the light spots and wherein the means for modulating at least an intensity or brightness of the light spots further comprises means for adjusting the intensity or brightness of the light spots in response to data indicating the states of the elements of the viewing surface.

30. A computer-usable media having computer-readable instructions adapted to cause a processor to perform a method, the method comprising:
- generating first control signals for changing states of elements of a surface according to image data; and
- generating second control signals for projecting light having an intensity based on the image data and on data indicating the states for the elements;
- wherein the data indicating the states for the elements is different than the image data.

31. The computer-usable media of claim 30, further comprising:
- receiving image data representative of a desired image;
- determining a desired greatest luminance of a first zone of the desired image;
- determining a desired greatest luminance of a second zone of the desired image;
- generating the first control signals to change states of elements of a first and a second zone of a viewing surface in response to the desired greatest luminance of the first and the second zones, respectively, of the desired image;
- generating second control signals to generate light spots of more than one color at an output power based on the desired greatest luminance of each zone of the viewing surface; and
- receiving timing information for adjusting a timing of the light spots in relation to the changing states of the elements of the viewing surface or receiving alignment information for adjusting an alignment of the light spots in relation to corresponding elements of the viewing surface.

* * * * *